United States Patent
Doi

(10) Patent No.: US 8,707,010 B2
(45) Date of Patent: Apr. 22, 2014

(54) SWITCH, INFORMATION PROCESSING APPARATUS, AND ADDRESS TRANSLATION METHOD

(75) Inventor: Tsunehisa Doi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 309 days.

(21) Appl. No.: 12/555,343

(22) Filed: Sep. 8, 2009

(65) Prior Publication Data

US 2009/0327645 A1 Dec. 31, 2009

Related U.S. Application Data

(63) Continuation of application No. PCT/JP2007/056695, filed on Mar. 28, 2007.

(51) Int. Cl.
*G06F 12/00* (2006.01)

(52) U.S. Cl.
USPC .............. 711/206; 711/E12.069; 710/22

(58) Field of Classification Search
USPC .................... 711/206; 710/22, 62
See application file for complete search history.

(56) References Cited

U.S. PATENT DOCUMENTS

| | | | |
|---|---|---|---|
| 5,835,738 A | 11/1998 | Blackledge, Jr. et al. | |
| 7,917,723 B2 * | 3/2011 | Wooten ..................... | 711/206 |
| 2002/0124127 A1 | 9/2002 | Dawkins et al. | |
| 2004/0210704 A1 | 10/2004 | Aoyama | |

FOREIGN PATENT DOCUMENTS

| | | |
|---|---|---|
| JP | A 5-250251 | 9/1993 |
| JP | 8-6893 | 1/1996 |
| JP | 5-250251 | 9/1998 |
| JP | 2002-304364 | 10/2002 |
| JP | A 2004-302922 | 10/2004 |

OTHER PUBLICATIONS

Japanese Office Action issued in corresponding Japanese Application No. 2009-507317, mailed May 31, 2011.
Online, "Intel® Virtualization Technology," Intel Technology Journal, vol. 10, Issue 03, Published on Aug. 10, 2006; searched on Mar. 22, 2007, URL:http://www.intel.com/technology/itj/2006/v10i3/2-io/5-platform-hardware-support.htm.
"Japanese Office Action" mailed by JPO and corresponding to Japanese application No. 2009-507317 on Mar. 6, 2012, with English translation.

* cited by examiner

*Primary Examiner* — Reginald Bragdon
*Assistant Examiner* — Hamdy S Ahmed
(74) *Attorney, Agent, or Firm* — Fujitsu Patent Center

(57) ABSTRACT

A switch connects and disconnects an input and output control device to and from an input and output device. The switch includes a storage unit that stores therein a translation table for use in translating a physical address used on a virtual machine that a guest operating system specifies as a direct memory access transfer destination to the input and output device, into a physical address used on a real machine; and an address translating unit that translates an address contained in a direct memory access request issued by the input and output device into a physical address used on the real machine by referring to the translation table.

17 Claims, 9 Drawing Sheets

SWITCH, INFORMATION PROCESSING APPARATUS, AND ADDRESS TRANSLATION METHOD

CROSS-REFERENCE TO RELATED APPLICATION(S)

This application is a continuation of PCT international application Ser. No. PCT/JP2007/056695 filed on Mar. 28, 2007 which designates the United States, incorporated herein by reference, the entire contents of which are incorporated herein by reference.

FIELD

The embodiment discussed herein is directed to a switch that connects and disconnects an input and output (I/O) control device to and from an I/O device, an information processing apparatus that includes the switch, and an address translation method performed by the switch.

BACKGROUND

Virtualization techniques achieve a virtual machine on a host operating system (OS). When a guest OS runs on the virtual machine, performance of application software running on the guest OS is considerably inferior to performance of equivalent application software running on the host OS. To this end, schemes for resolving performance degradation of application software running on a guest OS are being implemented in recent years.

One of main causes for degradation in performance of application software running on a guest OS is address translation for direct memory access (DMA). When it is necessary for application software running on a guest OS to access an input/output (I/O) device to perform an I/O operation, the guest OS requests the input/output device to perform a DMA operation so that the application software can perform the I/O operation. Although a memory area to be accessed by the I/O device needs to be specified using a physical address of a real information processing apparatus (hereinafter, "host physical address (HPA)"), the guest OS specifies the memory area out of consideration of the host physical address and uses a physical address of a virtual machine (hereinafter, "guest physical address (GPA)").

To deal with this, a computer program, which is referred to as a hypervisor that implements a virtual machine, has conventionally translated a GPA into an HPA by means of software. However, this address translation has incurred overhead, thereby degrading performance of application software. To eliminate the overhead, techniques, such as DMA remapping and address translation service (ATS), are being employed. The DMA remapping is a technique that achieves high-speed translation of a GPA into an HPA by means of hardware in an I/O control device that controls I/O operations. The ATS is a technique that achieves translation of a GPA into an HPA in an I/O device (see "Intel Virtualization Technology", (online), searched on Mar. 22, 2007, Internet <URL: http://www.intel.com/technology/itj/2006/v10i3/2-io/5-platform-hardware-support.htm>).

However, when an I/O control device is requested to handle a large number of I/O operations, address translation by DMA remapping disadvantageously increase a load placed on the I/O control device. This disadvantage may be reduced by employing ATS; however, address translation by ATS is disadvantageous in that it is necessary to adapt hardware and/or firmware of an I/O device to ATS. Put another way, ATS cannot be performed by using a conventional I/O device without modification.

SUMMARY

According to an aspect of the invention, a switch connects and disconnects an input and output control device to and from an input and output device. The switch includes a storage unit that stores therein a translation table for use in translating a physical address used on a virtual machine that a guest operating system specifies as a direct memory access transfer destination to the input and output device, into a physical address used on a real machine; and an address translating unit that translates an address contained in a direct memory access request issued by the input and output device into a physical address used on the real machine by referring to the translation table.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention are described in detail below with reference to the accompanying drawings. Note that the present invention is not limited to the embodiments.

Figure 8:
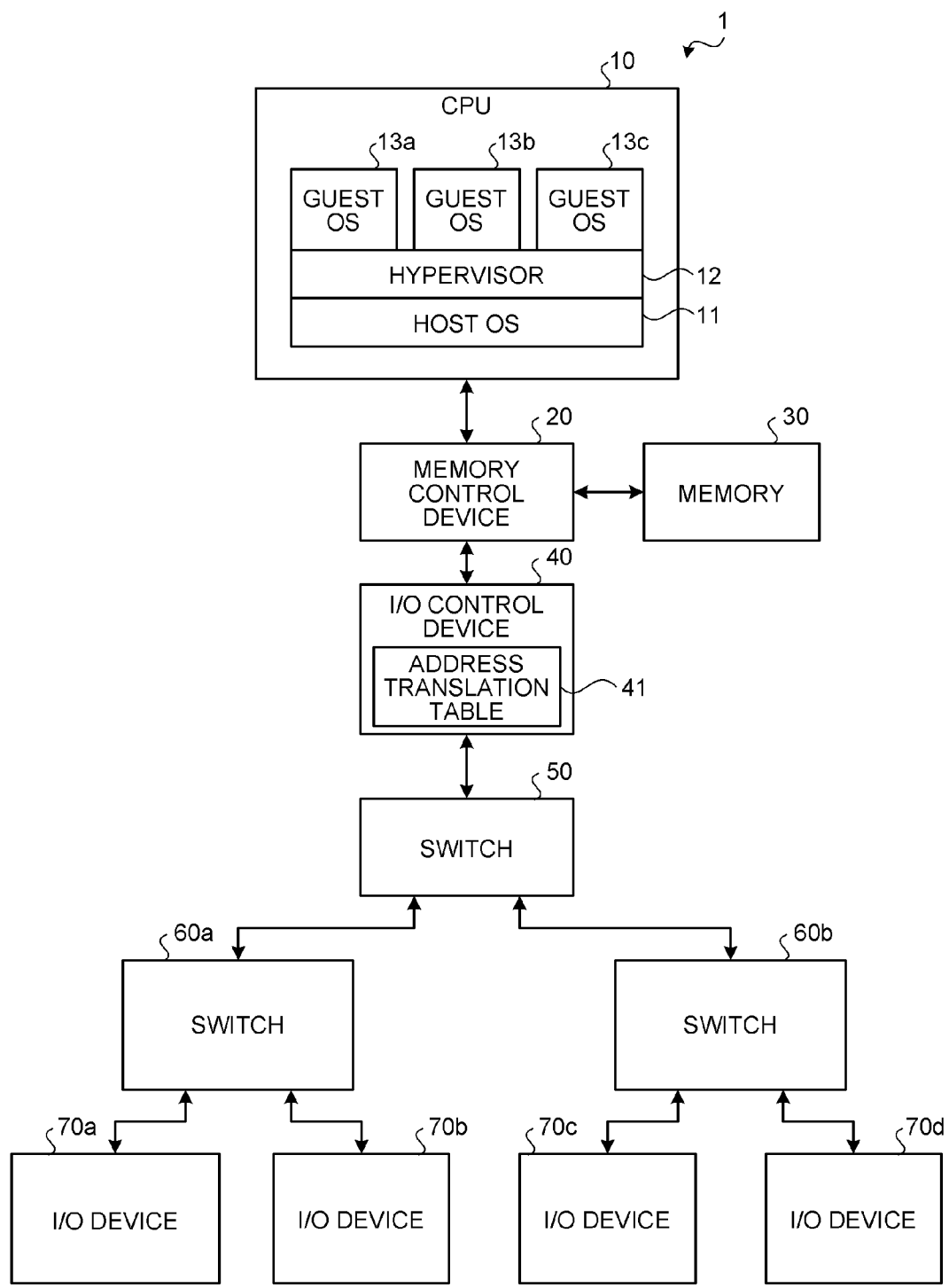
FIG. 8 is a schematic diagram of an example of a structure of a conventional information processing apparatus that supports direct memory access remapping.

First, structures of conventional information processing apparatuses will be described. FIG. 8 is a schematic diagram of an example of the structure of a conventional information processing apparatus 1 that supports direct memory access (DMA) remapping. The information processing apparatus 1 includes a central processing unit (CPU) 10, a memory control device 20, a memory 30, an input and output (I/O) control device 40, a switch 50, switches 60a and 60b, and I/O devices 70a to 70d.

The CPU 10 is a computing machine that performs various computations. In the example depicted in FIG. 8, the CPU 10 includes a host operating system (OS) 11, a hypervisor 12, and guest OSs 13a to 13c. The CPU 10 runs the hypervisor 12 on the host OS 11 and runs the guest OSs 13a to 13c on the hypervisor 12. The host OS 11 is an operating system that controls operations of the information processing apparatus 1. The hypervisor 12 is a computer program that implements a virtual machine. Each of the guest OSs 13a to 13c is an operating system that runs on the virtual machine.

The memory control device 20 is a control device that controls accesses to the memory 30. The memory 30 is a main storage of the information processing apparatus 1. The I/O control device 40 is a control device that controls accesses to the I/O devices 70a to 70d. Each of the switch 50, 60a, and 60b is a switching device that connects and disconnects the I/O control device 40 to and from the I/O devices 70a to 70d. The switch 50 is connected with the switches 60a and 60b such that the switch 50 is on the side (hereinafter, "upstream") of the CPU 10 relative to the switches 60a and 60b while the switches 60a and 60b are on the side (hereinafter, "downstream") of the I/O devices 70a to 70d relative to the switch 50.

The I/O devices 70a to 70d are various devices, such as a disk device and a network interface device. The I/O devices 70a and 70b are connected with the switch 60a to be arranged downstream of the same while the I/O devices 70c and 70d are connected with the switch 60b to be arranged downstream of the same.

In the terminology for PCI Express (PCIe), which is a widely-used standard for I/O buses, the I/O control device 40 corresponds to a root-complex device, the switches 50, 60a, and 60b correspond to PCIe switches, and the I/O devices 70a to 70d correspond to PCIe endpoint devices.

The I/O control device 40 has an address translation table 41. The address translation table 41 is for use in translating a GPA into an HPA. The GPA is specified by each of the guest OSs 13a to 13c when each of the guest OSs 13a to 13c issues a request for DMA to any of the I/O devices 70a to 70d. The address translation table 41 is to be edited by the hypervisor 12.

When any of the I/O device 70a to 70d attempts to access the memory 30 at an address, which is a GPA, to perform a DMA operation requested from any of the guest OSs 13a to 13c, the I/O control device 40 translates the address from the GPA into an HPA by utilizing the address translation table 41. Performing the address translation by means of hardware in this manner eliminates the need for the hypervisor 12 to perform address translation while the hypervisor 12 performs I/O operations, which speedups the operation of the guest OSs 13a to 13c.

However, this structure is disadvantageous in that when a large number of I/O operations are to be performed by the guest OSs 13a to 13c, a load placed on the I/O control device 40 increases, thereby causing degradation in performance due to operation delay of the I/O control device 40.

Figure 9:
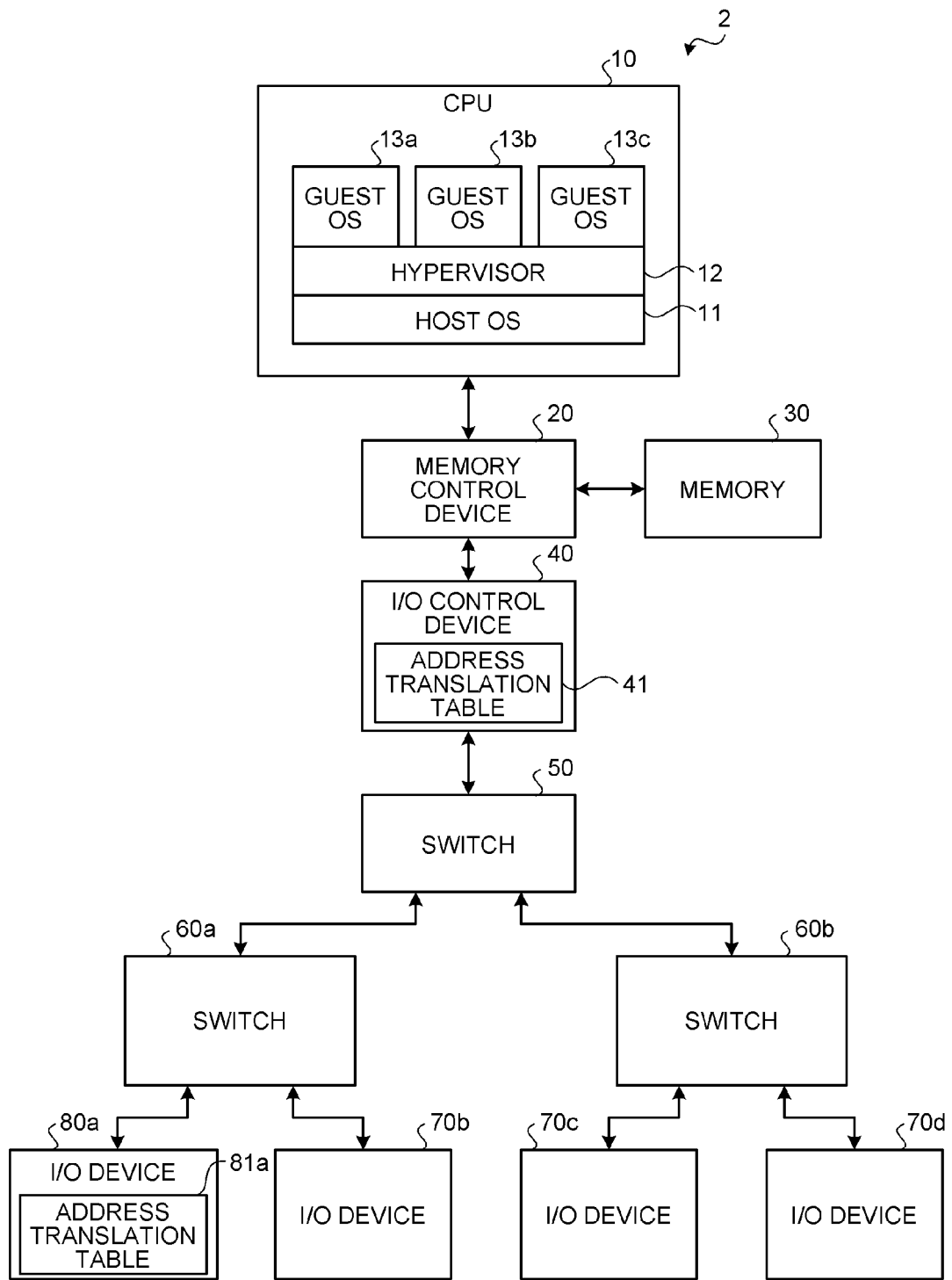
FIG. 9 is a schematic diagram of an example of a structure of another conventional information processing apparatus that supports address translation services.

FIG. 9 is a schematic diagram of an example of the structure of another conventional information processing apparatus 2 that supports the ATS. The information processing apparatus 2 differs from the information processing apparatus 1 in including an I/O device 80a in place of the I/O device 70a. The I/O device 80a has an address translation table 81a.

The address translation table 81a is for use in translating a GPA into an HPA. The GPA is specified by each of the guest OSs 13a to 13c when each of the quest OSs 13a to 13c issues a request for DMA to the I/O device 80a. The I/O device 80a transmits a request for extracting a translation table corresponding to the I/O device 80a from the address translation table 41 and returning the extracted translation table to the I/O device 80a according to a predetermined protocol. The I/O device 80a receives the translation table that is returned in response to the request, and caches the received translation table as the address translation table 81a.

When the I/O device 80a accesses the memory 30 at an address, which is a GPA, to perform a DMA operation requested from any of the guest OSs 13a to 13c, the I/O device 80a translates the address from the GPA into an HPA by utilizing the address translation table 81a. With this structure, because the I/O device 80a caches the address translation table 81a corresponding to the I/O device 80a itself and performs address translation by utilizing the cached address translation table, it is possible to lighten a load placed on the I/O control device 40 due to address translation.

However, to perform address translation by using the ATS, it is necessary to adapt hardware and/or firmware of I/O devices to ATS. Accordingly, when a large number of conventional I/O devices that do not support the ATS are connected with the I/O control device 40 as in the case of the I/O devices 70a to 70d, a load placed on the I/O control device 40 due to address translation is not sufficiently lightened.

Figure 1:
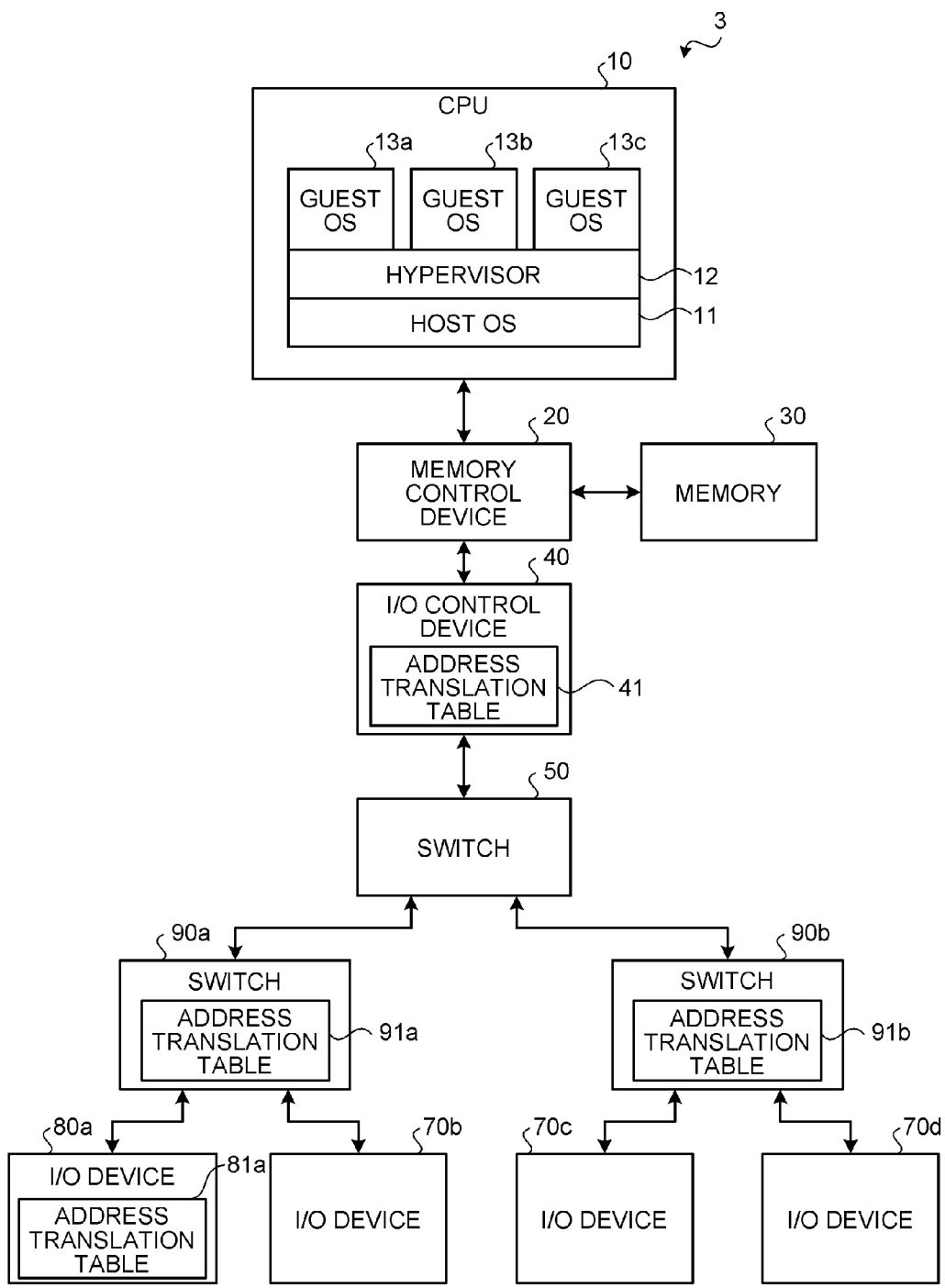
FIG. 1 is a schematic diagram of a structure of an information processing apparatus according to an embodiment of the present invention.

The structure of an information processing apparatus 3 according to an embodiment of the present invention will be described. FIG. 1 is a schematic diagram of an example of the structure of the information processing apparatus 3 according to the embodiment. The information processing apparatus 3 differs from the information processing apparatus 2 in that the information processing apparatus 3 includes switches 90a and 90b in place of the switches 60a and 60b. The switches 90a and 90b have address translation tables 91a and 91b, respectively.

An explanation is made about only the switch 90a because the switches 90a and 90b are similar to each other. The switch 90a monitors communications that are exchanged therethrough. When the I/O device 80a has transmitted, to the I/O control device 40, a request for transferring a translation table corresponding to the I/O device 80a to the I/O device 80a according to a predetermined protocol, the switch 90a caches the translation table being returned in response to the request as the address translation table 91a.

Then, when the I/O device 80a transmits the similar request to the I/O control device 40 again, the switch 90a traps the request, and extracts the translation table corresponding to the I/O device 80a from the address translation table 91a. The switch 90a then returns the extracted translation table to the I/O device 80a in lieu of the I/O control device 40. With this structure, because the switch 90a returns, in lieu of the I/O control device 40, the translation table corresponding to the I/O device 80a, the placed load on the I/O control device 40 is lightened.

The switch 90a requests, in lieu of the I/O device 70b that does not support the ATS, the I/O control device 40 to return a translation table corresponding to the I/O device 70b to the I/O device 70b, and caches the returned translation table in the address translation table 91a.

When the I/O device 80a or 70b attempts to access the memory 30 at an address, which is a GPA, specified by the I/O device 80a or 70b to perform a DMA operation requested from any of the guest OS 13a to 13c, the switch 90a translates the GPA into an HPA by referring to the address translation table 91*a*. With this structure, because the switch 90*a* performs address translation in lieu of the I/O control device 40, the load placed on the I/O control device 40 due to address translation is greatly lightened.

As in the example depicted in FIG. 1, the switch 90*a* and other switches are arranged in a multistage structure in which a lower stage switch supports a fewer number of I/O devices. Accordingly, by causing address translation to be performed by a lower stage switch (downstream switch) a load involved in the address translation is distributed, thereby preventing undesirable concentration of the load onto a specific switch.

When the I/O device 80*a* attempts to access the memory 30 at an address, which is an HPA, specified by the I/O device 80*a* to perform a DMA operation requested from any of the guest OSs 13*a* to 13*c*, the switch 90*a* performs verification to determine whether the HPA is a valid value by referring to translated addresses in the address translation table 91*a*. By verifying the HPA in this manner, even when the I/O device 80*a* specifies an invalid value as the HPA due to a failure or the like, contents of the memory 30 are protected from being destructed.

The switch 90*a* also caches, in the address translation table 91*a*, information on address translation that is input by a system administrator or the like through a predetermined setting computer program. This permits, even when the I/O control device 40 does not support DMA remapping, the switch 90*a* to perform address translation for the I/O device 80*a* or 70*b* in lieu of the I/O control device 40.

Figure 2:
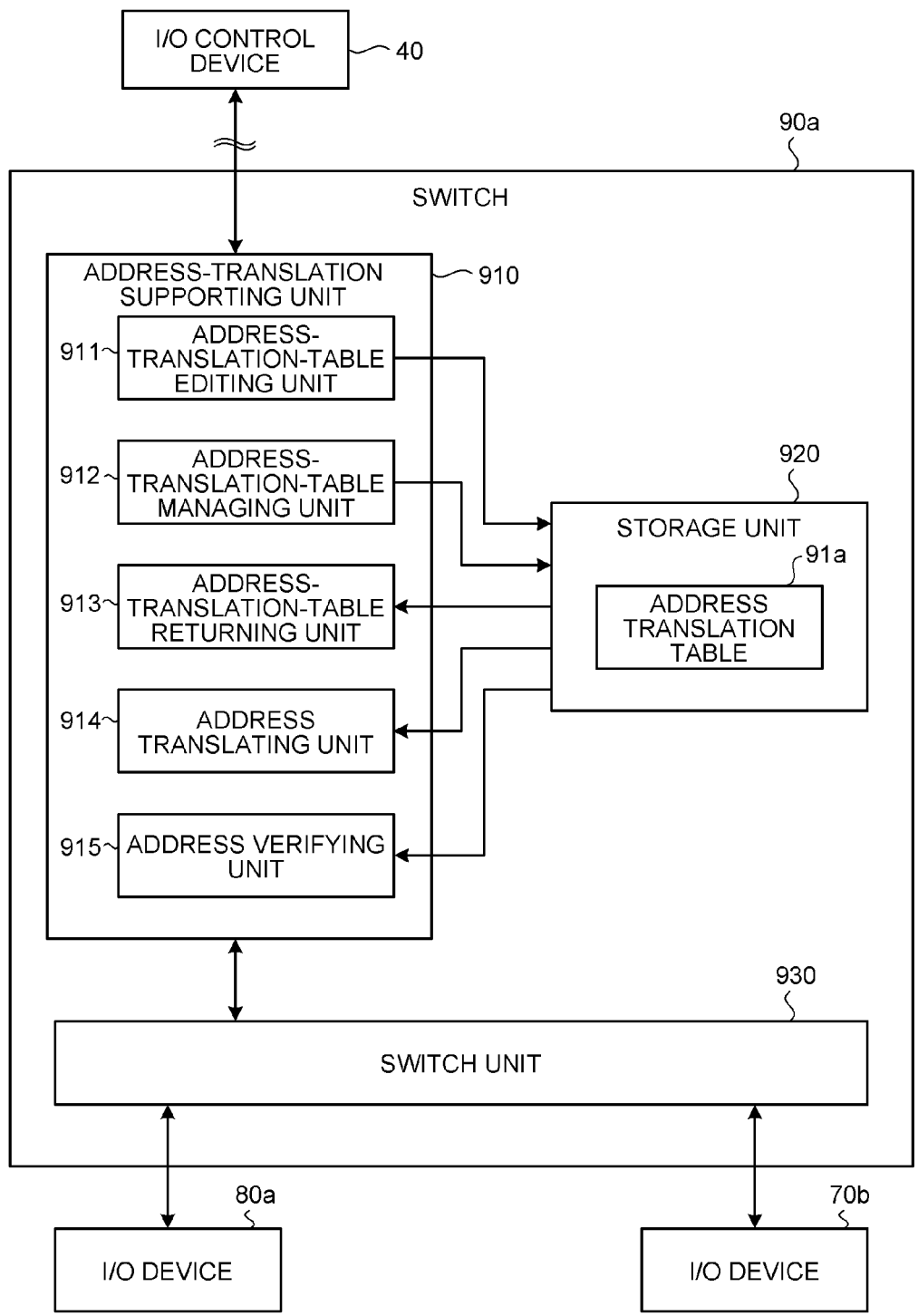
FIG. 2 is a block diagram of a structure of a switch depicted in FIG. 1.

The structure of the switch 90*a* depicted in FIG. 1 will be described. FIG. 2 is a block diagram of the structure of the switch 90*a*. The switch 90*a* includes an address-translation supporting unit 910, a storage unit 920, and a switch unit 930. The storage unit 920 stores therein the address translation table 91*a*. The switch unit 930 connects and disconnects the I/O control device 40 to and from the I/O device 80*a* and/or 70*b*.

The address-translation supporting unit 910 is a processing unit that performs various processing for supporting the address translation in an input control device, such as the I/O control device 40, and various I/O devices, such as the I/O device 80*a* and 70*b*. The address-translation supporting unit 910 includes an address-translation-table editing unit 911, an address-translation-table managing unit 912, an address-translation-table returning unit 913, an address translating unit 914, and an address verifying unit 915.

The address-translation-table editing unit 911 is a processing unit that edits the address translation table 91*a* based on the information input by the system administrator or the like through the predetermined setting computer program. The edit of the address translation table 91*a* by the system administrator or the like is performed in order that, for example, when the I/O control device 40 does not support the DMA remapping, the address-translation-table editing unit 911 can perform address translation for the I/O device 80*a* or 70*b* in lieu of the I/O control device 40.

The address translation table 91*a* is desirably a hash table or a multi-level table so as to speedup address translation from a GPA into an HPA.

The address-translation-table managing unit 912 automatically updates the address translation table 91*a*. More specifically, the address-translation-table managing unit 912 monitors a translation cache (TC) request transmitted from the I/O device 80*a* or the like to the I/O control device 40 and a TC response, and registers a translation table included in the TC response in the address translation table 91*a*. The TC request is a request that requests the I/O control device 40 to extract a translation table corresponding to the I/O device that has issued the TC request and to transfer the extracted translation table to the I/O device.

The address-translation-table managing unit 912 also transmits a TC request to the I/O control device 40 in lieu of an I/O device, such as the I/O device 70*b*, that does not support the ATS, and registers, in the address translation table 91*a*, a translation table included in a TC response returned in response to the TC request.

Because there is a limit in capacity of the storage unit 920, when the size of data stored in the address translation table 91*a* exceeds a predetermined upper limit, an translation table cannot be additionally stored in the storage unit 920 any more. In this case, the address-translation-table managing unit 912 deletes data of least importance in the address translation table 91*a* based on a least recently used (LRU) algorithm or the like.

When a portion of the address translation table 91*a* is deleted in this manner, if an address to be verified is present in the address translation table 91*a*, the address verifying unit 915, which will be described later, cannot determine whether the address is actually invalid or the address is valid but not present in the address translation table 91*a* because of being deleted. To this end, when a portion of the address translation table 91*a* is to be deleted due to shortage in free space of the storage unit 920, the address-translation-table managing unit 912 transmits an invalidation request to any I/O devices that may have cached the translation table corresponding to the portion to be deleted. Upon receipt of the invalidation request, the I/O device invalidates the translation table corresponding to the portion.

The invalidation request is issued when the I/O control device 40 deletes a portion of the address translation table 41 for some reason so as to maintain consistency between translation tables in the address translation table 91*a* and translation tables cached in I/O devices. The invalidation request requests any I/O device that may have cached a portion corresponding to the portion to be deleted, so as to invalidate the corresponding portion of the I/O device. Because the address-translation-table managing unit 912 transmits the invalidation request in this manner when a portion of the address translation table 91*a* is to be deleted, the consistency between the address translation table 91*a* and the translation table held by the I/O device is ensured. Accordingly, address verification is appropriately performed by the address verifying unit 915.

Meanwhile, the address-translation-table managing unit 912 deletes the portion to be deleted from the address translation table 91*a* in response to the invalidation request issued by the I/O control device 40.

When the address translation table 91*a* contains a translation table requested by a TC request, the address-translation-table returning unit 913 traps the TC request and returns a TC response that contains the requested translation table in lieu of the I/O control device 40.

When the I/O device 80*a* or the like attempts to access the memory 30 at an address, which is a GPA, specified by the I/O device 80*a* or the like to perform a DMA operation requested from any of the guest OSs 13*a* to 13*c*, the address translating unit 914 translates the GPA into an HPA by referring to the address translation table 91*a*.

Meanwhile, in PCI Express, it is possible to determine which OS is a DMA request source based on a requester identifier (ID) in a header of a transaction request that is issued by the I/O device 80*a* or the like for DMA. It is also possible to determine whether an address specified by the I/O device 80*a* or the like for DMA is a GPA or an HPA based on an address type in the header of the transaction request. More specifically, when a value of the address type is a code indicating a translated address, the specified address is an HPA, while a value of the address type is a code indicating an un-translated address, the specified address is a GPA.

When the I/O device 80*a* or the like attempts to access the memory 30 at an address, which is an HPA, specified by the I/O device 80*a* or the like to perform a DMA operation requested from any of the guest OSs 13*a* to 13*c*, the address verifying unit 915 verifies whether the HPA is an invalid value by referring to the translated addresses in the address translation table 91*a*.

A verification table for use in address verification performed by the address verifying unit 915 may be provided separately from the address translation table 91*a*. In this case, it is desirable that the verification table contains therein every translated address that may be cached in downstream I/O devices, or alternatively the address translation table 91*a* may contain therein only some of the translated addresses rather than all the translated addresses. The address verification can be performed by using only a translated address. Accordingly, by independently providing the verification table in this manner, a larger number of addresses can be verified with a relatively small memory capacity. When an optimum data structure for searching for a translated address is employed, the address verification can be speeded up.

Figure 3:
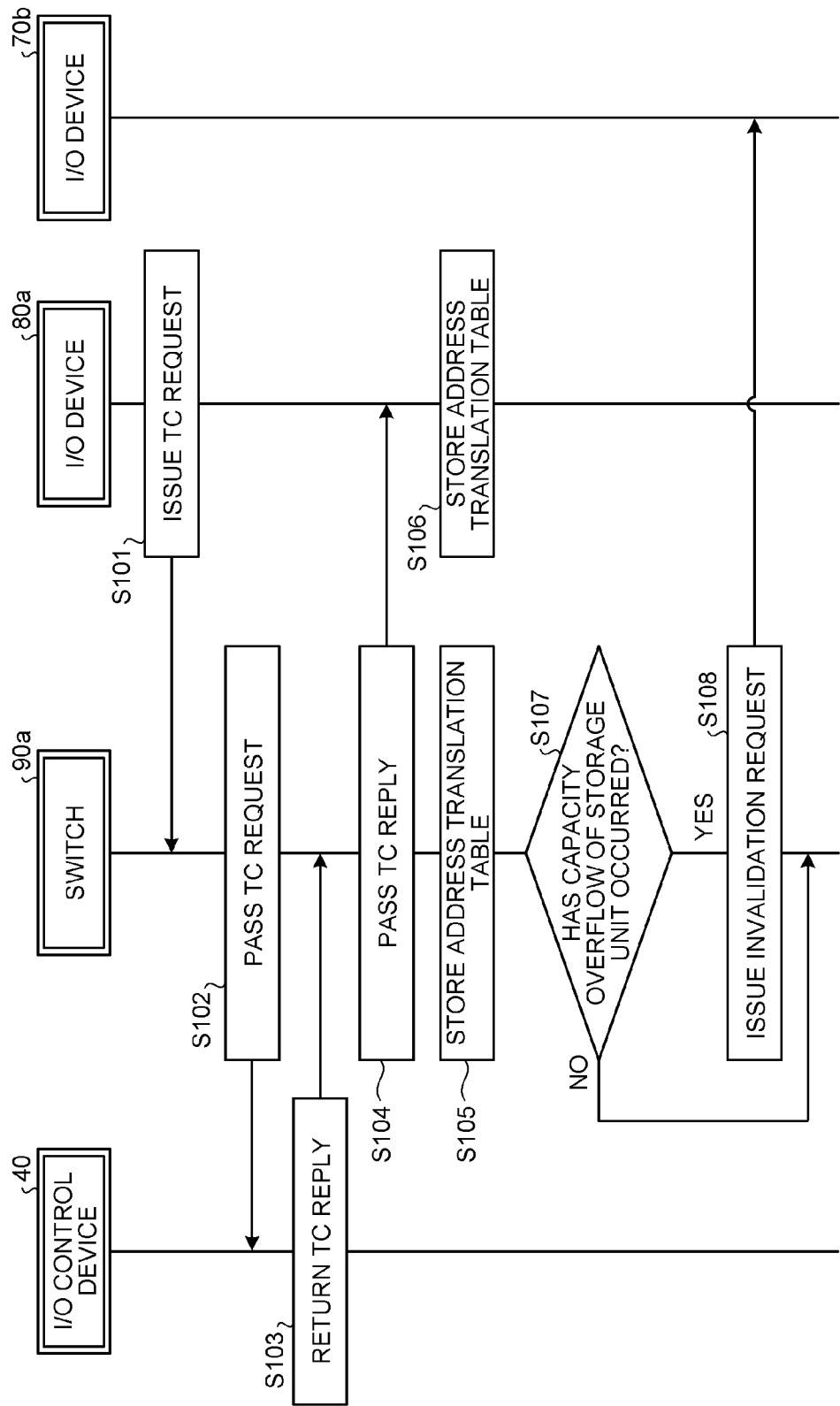
FIGS. 3 and 4 are sequential function charts of process procedures performed by the information processing apparatus depicted in FIG. 1 when an input/output (I/O) device issues a translation cache request.
Figure 4:
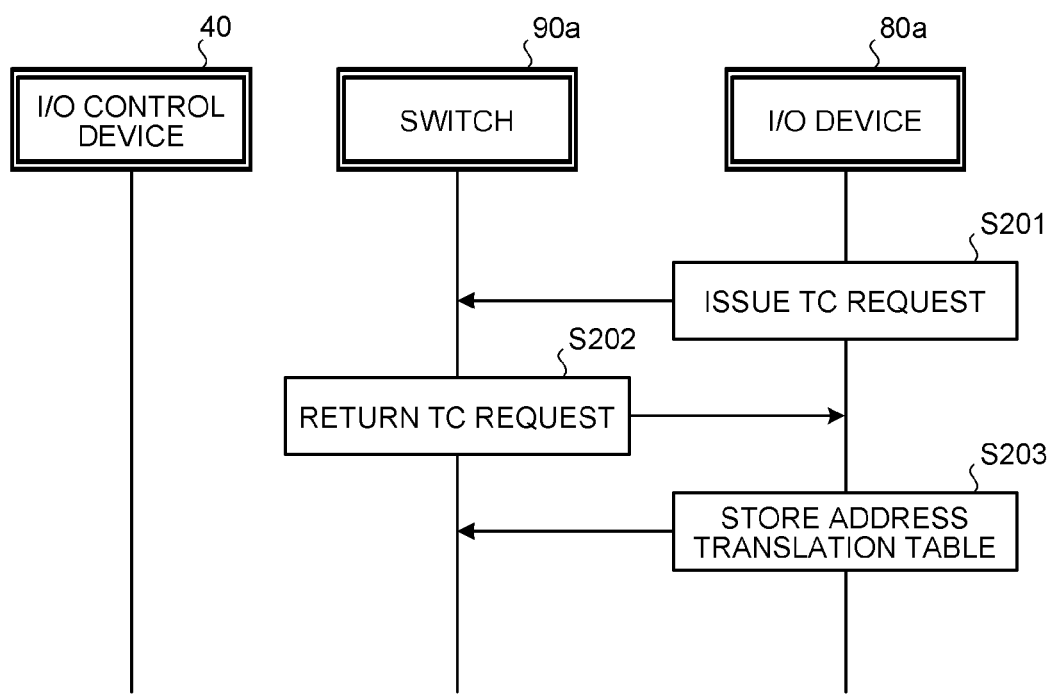

Process procedures performed by the information processing apparatus 3 will be described below. FIGS. 3 and 4 are sequential function charts of process procedures performed by the information processing apparatus 3 when the I/O device 80*a* issues a TC request. As depicted in FIGS. 3 and 4, when a TC request is issued by the I/O device 80*a* (Step S101), the switch 90*a* passes the TC request to the upstream I/O control device 40 so long as a translation table corresponding to the I/O device 80*a* is not present in the address translation table 91*a* (Step S102).

Upon receipt of the TC request, the I/O control device 40 extracts a translation table corresponding to the I/O device 80*a* from the address translation table 41, and returns the extracted translation table as a TC reply (Step S103). The switch 90*a* transfers the TC reply to the I/O device 80*a* (Step S104), and registers, in the address translation table 91*a*, the translation table contained in the TC reply (Step at S105). Upon receipt of the TC reply, the I/O device 80*a* stores the translation table contained in the TC reply as the address translation table 81*a* (Step at S106).

If a capacity overflow of the storage unit 920 occurs when the switch 90*a* resisters the address translation table in the address translation table 91*a*, and a portion of the address translation table corresponding to the I/O device 70*b* is deleted from the storage unit 920 (Yes at Step S107), the switch 90*a* issues an invalidation request to the I/O device 70*b* that requests discard of the portion (Step S108).

Thereafter, if the I/O device 80*a* issued a TC request again (Step S201), as depicted in FIG. 4, the switch 90*a* extracts the translation table corresponding to the I/O device 80*a* from the address translation table 91*a* and returns the translation table to the I/O device 80*a* as a TC reply to the TC request (Step S202). Upon receipt of the TC reply, the I/O device 80*a* stores the translation table contained in the TC reply as the address translation table 81*a* (Step at S203).

Figure 5:
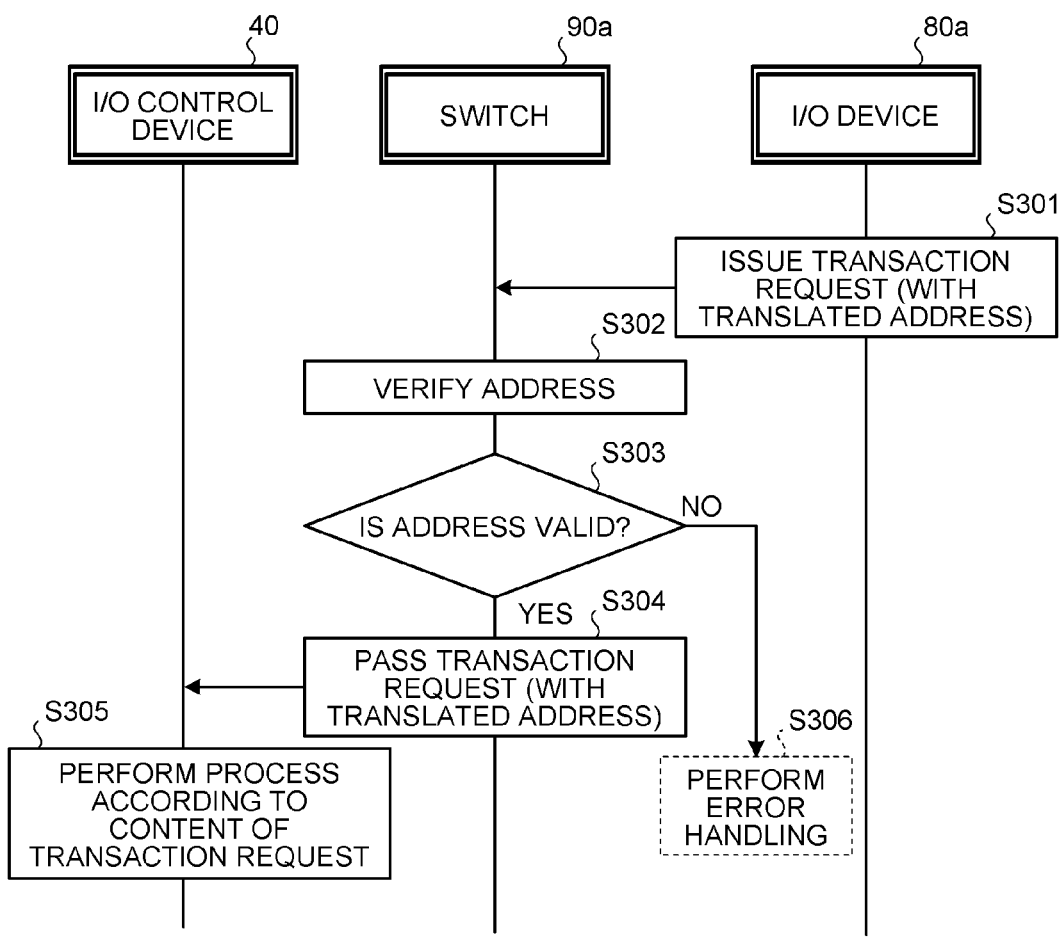
FIG. 5 is a sequential function chart of a process procedure performed by the information processing apparatus when the I/O device specifies a translated address and issues a transaction request.

FIG. 5 is a sequential function chart of a process procedure performed by the information processing apparatus 3 when the I/O device 80*a* specifies a translated address and issues a transaction request. When the I/O device 80*a* specifies a translated address, i.e., an HPA, and issues a transaction request for DMA (Step S301), the switch 90*a* verifies the specified address by referring to translated addresses in the address translation table 91*a* (Step S302).

If the specified address is determined to be valid (Yes at Step S303), the switch 90*a* passes the transaction request to the upstream I/O control device 40 (Step S304). Upon receipt of the transaction request, the I/O control device 40 performs process according to a content of the transaction request (Step S305). If the specified address is determined to be invalid (No at Step S303), the switch 90*a* performs error handling (Step S306).

Figure 6:
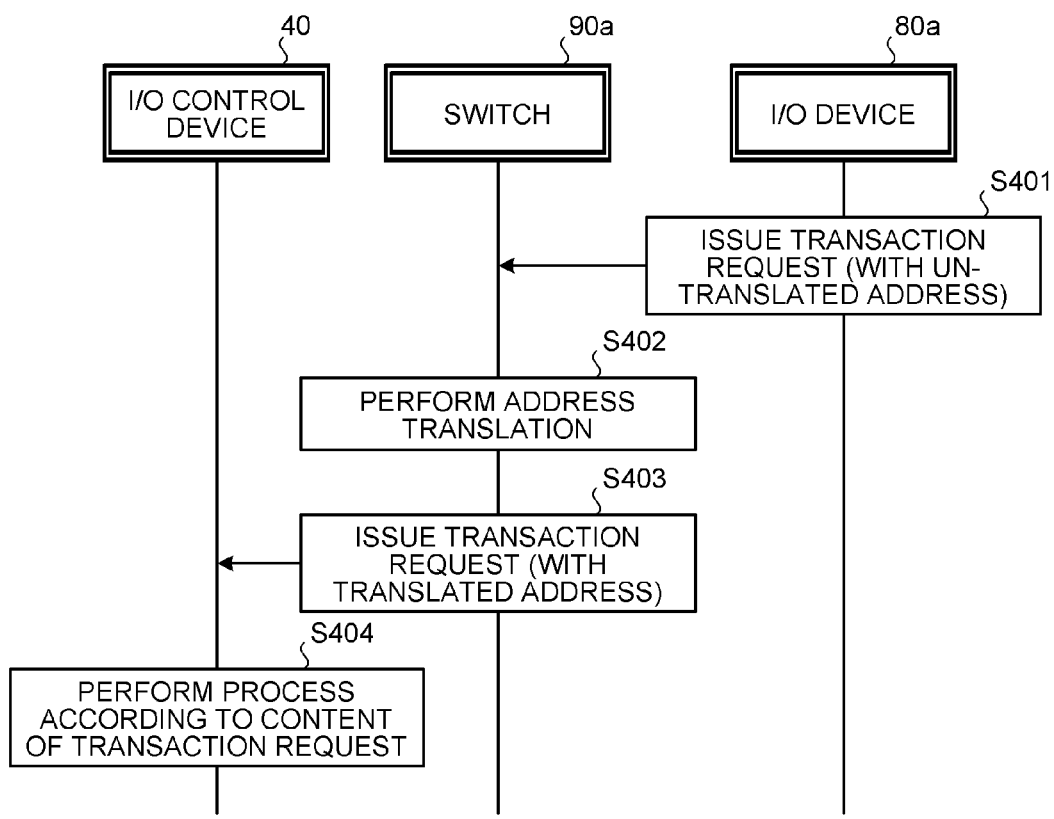
FIG. 6 is a sequential function chart of a process procedure performed by the information processing apparatus when the I/O device has specifies an un-translated address and issues a transaction request.

FIG. 6 is a sequential function chart of a process procedure performed by the information processing apparatus 3 when the I/O device 80*a* specifies an un-translated address and issues a transaction request. When the I/O device 80*a* specifies an un-translated address, i.e., a GPA, and issues a transaction request for DMA (Step S401), the switch 90*a* translates the specified address into an HPA by referring to the address translation table 91*a* (Step S402). The switch 90*a* then passes a transaction request with the translated address to the upstream I/O control device 40 (Step S403). Upon receipt of the transaction request, the I/O control device 40 performs a process according to a content of the transaction request (Step S404).

Figure 7:
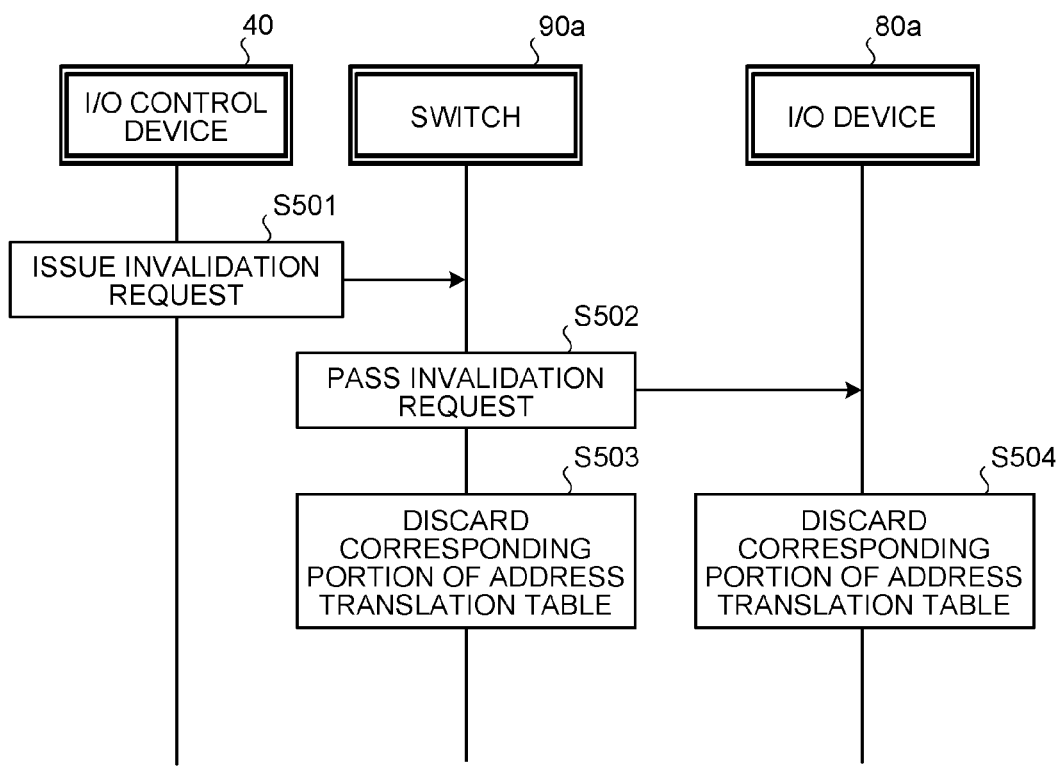
FIG. 7 is a sequential function chart of a process procedure performed by the information processing apparatus when the I/O control device issues an invalidation request to the I/O device.

FIG. 7 is a sequential function chart of a process procedure performed by the information processing apparatus 3 when the I/O control device 40 issues an invalidation request to the I/O device 80*a*. When the I/O control device 40 issues an invalidation request to the I/O device 80*a* (Step S501), the switch 90*a* passes the invalidation request to the I/O device 80*a* (Step S502) and discards a corresponding portion of the address translation table 91*a* (S503). Upon receipt of the invalidation request, the I/O device 80*a* discards a corresponding portion of the address translation table 81*a* (Step S504).

As described above, according to the embodiment, the switch that connects and disconnects the I/O control device to and from the I/O device includes the address translation table for use in translating a physical address used on a virtual machine, which is specified as a DMA transfer destination, into a physical address used on a real machine, so as to perform address translation. Accordingly, a load placed on the I/O control device 40 due to address translation is lightened, thereby improving performance of application software on the guest OS.

According to the embodiment, the switch obtains a translation table by monitoring communication between an I/O control device and an I/O device. Accordingly, it is possible to automatically register the translation table in the switch.

According to the embodiment, the switch actively requests an I/O control device to return a translation table. Accordingly, it is possible to automatically register, in the switch, even a translation table corresponding to an I/O device that does not request the I/O control device to return the translation table.

According to the embodiment, when the switch deletes a portion of the translation table, the switch requests an I/O device, which has stored therein a portion corresponding to the portion to be deleted, to delete the corresponding portion from the I/O device. Accordingly, a translation table cached in the switch and a translation table cached in the I/O device can be advantageously maintained consistent with each other.

According to the embodiment, when a downstream I/O device deletes a translation table, the switch deletes, from the translation table stored in the switch itself, a portion corresponding to the translation table to be deleted. Accordingly, a translation table cached in the switch and a translation table cached in the I/O device can be advantageously maintained consistent with each other.

According to the embodiment, it is possible to externally edit contents of a translation table. Accordingly, even when the I/O control device does not has an address translation table, the switch can advantageously perform a process related to address translation in lieu of the I/O control device.

According to the embodiment, the switch transfers, in lieu of an I/O control device, a translation table to an I/O device. Accordingly, a load placed on the I/O control device can be advantageously lightened.

According to the embodiment, the switch verifies an address translated by an I/O device by referring to a translation table. Hence, reliability can be advantageously increased.

According to the embodiment, information for use in verification of an address translated by an I/O device is provided separately from a translation table. Accordingly, it is possible to verify a relatively large number of addresses by using a storage unit having a relatively small storage capacity.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A switch that connects and disconnects an input and output control device to and from an input and output device, the switch comprising:
   a storage unit that stores therein a translation table for use in translating a physical address used on a virtual machine that a guest operating system specifies as a direct memory access transfer destination to the input and output device, into a physical address used on a real machine;
   an address translating unit that translates an address contained in a direct memory access request issued by the input and output device into a physical address used on the real machine by referring to the translation table; and
   an address-translation-table managing unit that, when the switch receives a request directed to the input and output control device from the input and output device, the request being to transfer a translation table to the input and output device to store therein and the requested translation table is not stored in the storage unit, the switch passing the request to the input and output control device, stores in the storage unit the requested translation table transferred from the input and output control device via the switch to the input and output device.

2. The switch according to claim 1, wherein the address-translation-table managing unit requests the input and output control device to transfer the translation table for the input and output device that does not store the translation table, and stores the transferred translation table in the storage unit.

3. The switch according to claim 1 wherein
   when a portion of the translation table is to be deleted from the storage unit, the address-translation-table managing unit requests the input and output device, which has stored therein a portion corresponding to the portion to be deleted, to delete the corresponding portion from the input and output device.

4. The switch according to claim 1, wherein when the input and output control device transmits to the input and output device an invalidation request that requests the input and output device to invalidate the translation table, the address-translation-table managing unit invalidates a portion of the translation table stored in the storage unit, the portion corresponding to the translation table to be invalidated.

5. The switch according to claim 1, further comprising an address-translation-table editing unit that edits the at least one translation table stored in the storage unit.

6. The switch according to claim 1, further comprising an address-translation-table returning unit that returns, when the translation table that the input and output device requests the input and output control device to transfer has been stored in the storage unit, the translation table stored in the storage unit to the input and output device in lieu of the input and output control device.

7. The switch according to claim 1, further comprising an address verifying unit that verifies, when an address contained in a direct memory access request issued by the input and output device is a physical address used on the real machine translated by the input and output device, the physical address by referring to the translation table.

8. The switch according to claim 1, wherein
   the storage unit stores therein a list of translated addresses in a translation table that has stored in the input and output device, and
   the switch further comprises an address verifying unit that verifies, when an address contained in a direct memory access request issued by the input and output device is a physical address used on the real machine translated by the input and output device, the address by referring to the list.

9. An information processing apparatus including a switch that connects and disconnects an input and output control device to and from an input and output device, wherein
   the switch comprises:
   a storage unit that stores therein a translation table for use in translating a physical address used on a virtual machine that a guest operating system specifies as a direct memory access transfer destination to the input and output device, into a physical address used on a real machine;
   an address translating unit that translates an address contained in a direct memory access request issued by the input and output device into a physical address used on the real machine by referring to the translation table; and
   an address-translation-table managing unit that, when the switch receives a request directed to the input and output control device from the input and output device, the request being to transfer a translation table to the input and output device to store therein and the requested translation table is not stored in the storage unit, the switch passing the request to the input and output control device, stores in the storage unit the requested translation table transferred from the input and output control device via the switch to the input and output device.

10. The information processing apparatus according to claim 9, wherein the address-translation-table managing unit requests the input and output control device to transfer the translation table for the input and output device that does not store the translation table, and stores the transferred translation table in the storage unit.

11. The information processing apparatus according to claim 9, wherein
when a portion of the translation table is to be deleted from the storage unit, the address-translation-table managing unit requests the input and output device, which has stored therein a portion corresponding to the portion to be deleted, to delete the corresponding portion from the input and output device.

12. The information processing apparatus according to claim 9, wherein when the input and output control device transmits to the input and output device an invalidation request that requests the input and output device to invalidate the translation table, the address-translation-table managing unit invalidates a portion of the translation table stored in the storage unit, the portion corresponding to the translation table to be invalidated.

13. The information processing apparatus according to claim 9, wherein the switch further comprises an address-translation-table editing unit that edits the at least one translation table stored in the storage unit.

14. The information processing apparatus according to claim 9, wherein the switch further comprises an address-translation-table returning unit that returns, when the translation table that the input and output device requests the input and output control device to transfer has been stored in the storage unit, the translation table stored in the storage unit to the input and output device in lieu of the input and output control device.

15. The information processing apparatus according to claim 9, wherein the switch further comprises an address verifying unit that verifies, when an address contained in a direct memory access request issued by the input and output device is a physical address used on the real machine translated by the input and output device, the physical address by referring to the translation table.

16. The information processing apparatus according to claim 9, wherein
the storage unit stores therein a list of translated addresses in a translation table that has stored in the input and output device, and
the switch further comprises an address verifying unit that verifies, when an address contained in a direct memory access request issued by the input and output device is a physical address used on the real machine translated by the input and output device, the address by referring to the list.

17. An address translation method performed by a switch that connects and disconnects an input and output control device to and from an input and output device, the address translation method comprising:
storing, in a storage unit, a translation table for use in translating a physical address used on a virtual machine that a guest operating system specifies as a direct memory access transfer destination to the input and output device, into a physical address used on a real machine;
translating an address contained in a direct memory access request issued by the input and output device into a physical address used on the real machine by referring to the translation table; and
storing, when the switch receives a request directed to the input and output control device from the input and output device, the request being to transfer a translation table to the input and output device to store therein and the requested translation table is not stored in the storage unit, the switch passing the request to the input and output control device, in the storage unit the requested translation table transferred from the input and output control device via the switch to the input and output device.

* * * * *